United States Patent
Gomez

(10) Patent No.: US 12,491,826 B2
(45) Date of Patent: Dec. 9, 2025

(54) FUEL-FILL INTEGRATED HAND SANITIZER DISPENSER

(71) Applicant: CNH Industrial America LLC, New Holland, PA (US)

(72) Inventor: Lorenzo Gomez, Schiller Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 387 days.

(21) Appl. No.: 18/084,611

(22) Filed: Dec. 20, 2022

(65) Prior Publication Data
US 2024/0198930 A1    Jun. 20, 2024

(51) Int. Cl.
*B60R 15/02* (2006.01)
*B60R 11/00* (2006.01)

(52) U.S. Cl.
CPC .............. *B60R 15/02* (2013.01); *B60R 11/00* (2013.01); *B60R 2011/004* (2013.01); *B60R 2011/0043* (2013.01)

(58) Field of Classification Search
CPC ............... B60R 15/02; B60R 2011/004; B60R 2011/0043; B60K 2015/0553; B60K 15/05
USPC ..................................................... 296/97.22
See application file for complete search history.

(56) References Cited

U.S. PATENT DOCUMENTS

| | | | |
|---|---|---|---|
| 6,189,959 B1 * | 2/2001 | VanAssche | B60K 15/05 16/86 B |
| 9,758,101 B2 * | 9/2017 | Clair-Chalupka | B60R 1/04 |
| 10,844,640 B2 * | 11/2020 | Ichiki | E05B 77/34 |
| 11,197,588 B1 * | 12/2021 | Thibideau | A47K 5/1217 |
| 11,292,393 B1 * | 4/2022 | Baker | B60R 15/00 |
| 11,535,178 B1 * | 12/2022 | James | B60R 15/02 |
| 11,700,978 B2 * | 7/2023 | Sempier | A47K 5/1202 222/608 |
| 2006/0153733 A1 * | 7/2006 | Sassoon | E05B 1/0069 422/292 |
| 2015/0183316 A1 * | 7/2015 | Wakamatsu | B60K 15/05 340/426.24 |
| 2021/0378457 A1 * | 12/2021 | Christensen | B60R 11/00 |
| 2022/0061593 A1 * | 3/2022 | Milian | A47K 10/08 |
| 2022/0161988 A1 * | 5/2022 | Matysek | B65D 33/18 |

* cited by examiner

*Primary Examiner* — Jason S Morrow
(74) *Attorney, Agent, or Firm* — Buchanan Ingersoll & Rooney PC

(57) ABSTRACT

An automotive vehicle includes: a vehicle body; and a hand sanitizer dispenser system coupled with the vehicle body.

14 Claims, 4 Drawing Sheets

FUEL-FILL INTEGRATED HAND SANITIZER DISPENSER

FIELD OF THE INVENTION

The present invention pertains to automotive vehicles, and, more specifically, to vehicular bodies.

BACKGROUND OF THE INVENTION

The health benefits of hand cleaning, such as with soap and water or with hand sanitizer, have been known for some time. Such benefits include eliminating germs and thus preventing sickness. The COVID-19 pandemic has heightened the general public's attention on 44414 cleaning in an effort to mitigate the spread of COVID-19 after touching such surfaces.

For example, when filling up an automotive vehicle with fuel at a gas station, the vehicle operator nowadays may look for a hand sanitizer dispenser somewhere at the gas station or may use the operator's own portable hand sanitizer, which the operator may have stored somewhere, such as in a glove compartment of the vehicle, a backpack, or a purse. However, not all gas stations have hand sanitizer dispensers, and in any event such dispensers may be empty when needed. Also, after pumping the gas and thus after having touched the fuel nozzle at a gas station, if the vehicle operator is using the vehicle operator's own hand sanitizer, then the vehicle operator (assuming the hand sanitizer is stored in the glove compartment) has to touch the vehicle door handle, potentially the steering wheel, and then the glove compartment prior to applying hand sanitizer. By the time the vehicle operator has retrieved the hand sanitizer, the vehicle operator has potentially sullied some high use areas.

What is needed in the art is an effective way to clean one's hands after having refueled one's automotive vehicle and prior to touching other high use surfaces of a vehicle.

SUMMARY OF THE INVENTION

The present invention provides a hand sanitizer dispenser system coupled with an automotive vehicle body.

The invention in one form is directed to an automotive vehicle, which includes: a vehicle body; and a hand sanitizer dispenser system coupled with the vehicle body.

The invention in another form is directed to a hand sanitizer dispenser system, including: a hand sanitizer dispenser system configured for being coupled with a vehicle body of an automotive vehicle.

The invention in yet another form is directed to a method of using an automotive vehicle, the method including the steps of: providing a vehicle body; and coupling a hand sanitizer dispenser system with the vehicle body.

An advantage of the present invention is that it provides a convenient way to sanitize one's hands after refueling a vehicle.

Another advantage of the present invention is that it integrates a hand sanitizer dispenser in a well for a fuel-fill inlet. In this way, hand sanitizer is readily accessible after refiling vehicle 100 with fuel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with a vehicle and/or components thereof are usually determined with reference to the direction of forward operative travel of the vehicle, but they should not be construed as limiting. The terms "longitudinal" and "transverse" are determined with reference to the fore-and-aft direction of the vehicle and are equally not to be construed as limiting.

Figure 1:
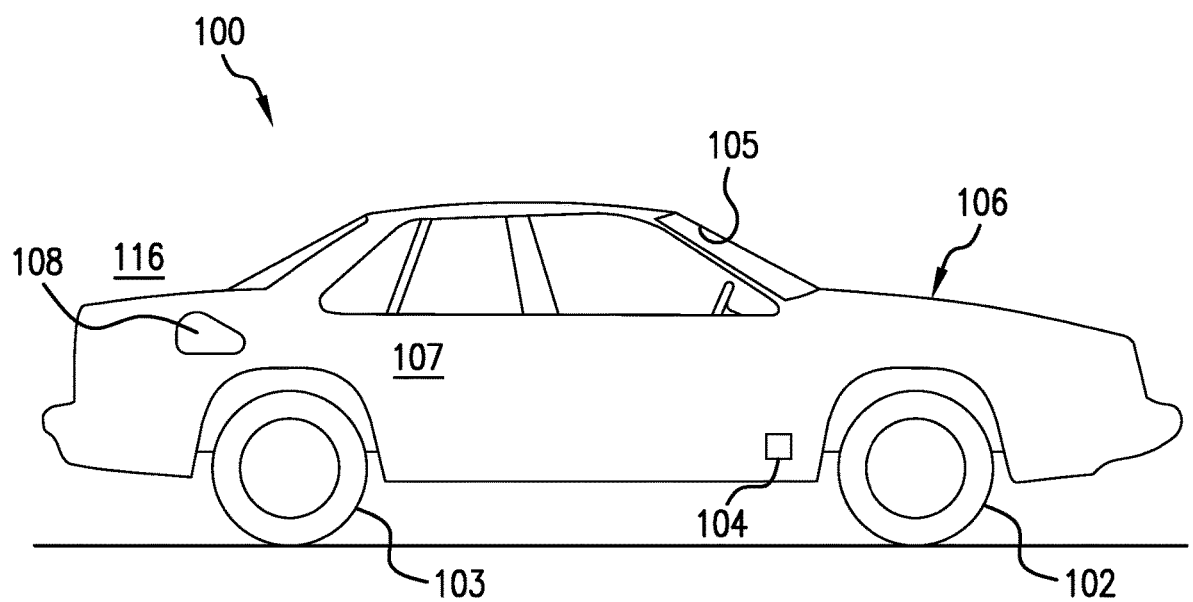
FIG. 1 illustrates schematically a side view of an exemplary embodiment of an automotive vehicle including a vehicle body, in accordance with an exemplary embodiment of the present invention.

Referring now to the drawings, and more particularly to FIG. 1, there is shown an embodiment of an automotive vehicle 100 according to the present invention. Though not shown, vehicle 100 can include a control system for controlling any aspect of vehicle 100. Vehicle 100 can be an operator-driven vehicle or an autonomous vehicle, though vehicle 100 is discussed herein as being formed in the embodiment of an operator-driven vehicle 100. Further, vehicle 100 can be formed as any type of vehicle that includes a port for replenishing that which is needed to produce motive power of vehicle 100. That which is needed to produce the motive power may be generically referred to as fuel, which includes but is not limited to gasoline, diesel fuel, hydrogen, and/or an electrical charge. Such replenishing generically includes, but is not limited to, refilling, refueling, and/or recharging, as the case may be (in an electrical vehicle context, such replenishing with the electrical charge is often referred to as recharging, though herein such replenishing can also be understood to be a type of refueling or refilling). It can be appreciated that the present invention applies to any type of that which is needed to produce the motive force (that is, as used herein, any type of fuel) and any type of replenishing.

Vehicle 100 includes a pair of front wheels 102, a pair of rear wheels 103, and a chassis 104 (which can also be referred to as a vehicle frame 104 and is shown schematically by way of a square in FIG. 1) coupled to and supported by the wheels 102, 103. An operator's cabin 105 (which can also be referred to as a passenger compartment) may be supported by a portion of frame 104 and may house various input devices for permitting an operator to control the operation of vehicle 100. Additionally, vehicle 100 may include an engine and a transmission mounted on frame 104. Vehicle 100 further includes a vehicle body 106. Body 106 forms an outer shell or skin of vehicle 100, includes an exterior side 107 (which defines an exterior space 116) and can include a plurality of panels. Further, body 106 can be carried by frame 104, or, alternatively, body 106 can form frame 104 (a unibody), as is known, though the former is assumed to be the care herein for purposes of discussion. Body 106 includes a well cover 108 (which can be referred to as a latch 108) configured for selectively covering a well 209 of body 106 (FIG. 2), well cover 108 is shown in a closed position in FIG. 1 and in an open position in FIG. 2.

Figure 2:
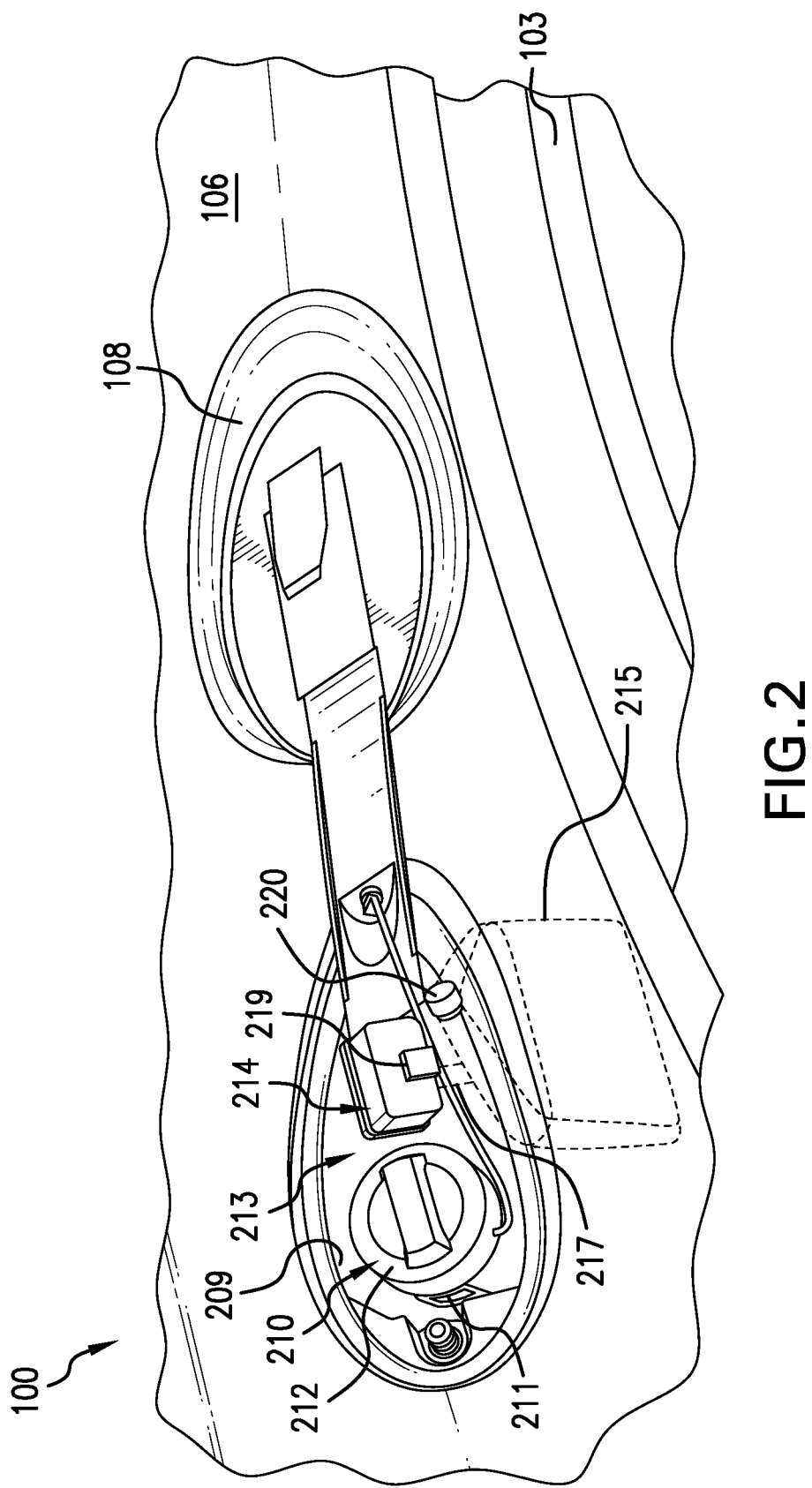
FIG. 2 illustrates schematically a perspective view of the automotive vehicle of FIG. 1, with portions broken away, the automotive vehicle including the vehicle body and a hand sanitizer dispenser system, in accordance with an exemplary embodiment of the present invention.

Referring now to FIG. 2, there is shown vehicle 100, which includes rear wheel 103 and body 106. Vehicle 100 further includes a fueling assembly 210 coupled with body 106 in known manner. Fueling assembly 210 includes a fuel inlet 211 and a fuel inlet cap 212, fuel inlet 211 configured for receiving a fuel nozzle which dispenses fuel into fuel inlet 211 (the fuel then flowing to a fuel tank of vehicle 100), fuel inlet cap 212 configured for selectively attaching (for example, threadably) to fuel inlet 211 to thereby cover fuel inlet 211. Body 106 includes well 209, which forms a recess with respect to exterior side 107 of body 106, well 209 selectively being covered by well cover 108. Well 209 can be located in any location of body 106, including but not limited to in the vicinity of a wheel well of vehicle 100 or a trunk of vehicle 100.

Vehicle 100 further includes a hand sanitizer dispenser system 213 coupled with body 106 in any suitable manner. Hand sanitizer dispenser system 213 includes a hand sanitizer dispenser assembly 214, a reservoir 215, a connection 217, and a port 220. Dispenser assembly 214 is coupled with body 106 and is configured for being accessed from exterior space 116 for normal use by the operator from exterior space 116. Dispenser assembly 214 and fueling assembly 210 can be positioned adjacent to one another in well 209, such that both dispenser assembly 214 and fueling assembly 210 can be selectively covered by well cover 108. In this way, well 209 is larger than a conventional well which has therein only a fueling assembly. Further, dispenser assembly 214 can be configured to have a low profile, so as to enable dispenser assembly 214 to hide behind well cover 108. Well 209 can include a hole (not labeled) which can be formed during manufacturing of body 106 or formed subsequently thereto (in an aftermarket process or as an aftermarket product attached to body 106) by, for example, cutting or drilling, this hole receiving at least a portion of dispenser assembly 214 so that dispenser assembly 214 can mount to well 209 and thereby form a coupling between dispenser assembly 214 and well 209; this coupling can be achieved in any suitable manner, such as by way of fasteners and washers (such fasteners can, for example, attach to slots or tabs or the like of dispenser assembly 214 and/or well 109) and/or by way of a snap fit. Dispenser assembly 214 is configured for being triggered to dispense a hand sanitizer substance 318 (such substance 318 is known) in any suitable manner, for example, manually (FIGS. 2 and 3) or automatically (FIG. 4). Dispenser assembly 214 can be triggered manually to dispense sanitizer substance 318 in any suitable manner, such as by the operator pushing a button 219, by pulling a lever, or the like, so as to pump or otherwise move sanitizer substance 318 from reservoir 215 and through and out of dispenser assembly 214 to user. Dispenser assembly 214 can further include an output device 321 (FIG. 3) configured for outputting sanitizer substance 318 to user.

Reservoir 215 (which can also be referred to as reservoir tank 215 or tank 215) is configured for storing sanitizer substance 318 therein (until dispenser assembly 214 draws sanitizer substance 318 from reservoir 215 to be dispensed to a user) and, optionally, for receiving refills of sanitizer substance 318. Reservoir 215 (shown in broken lines in FIG. 2) can be formed: by molding reservoir 215 into body 106; by welding reservoir 215 to body 106; by stamping reservoir 215 into sheet metal (that is, integrating reservoir 215 into stamped sheet metal), and then by attaching reservoir 215 to body 106, such as by way of welding and/or fasteners; or, by otherwise connecting reservoir 215 with body 106 in any suitable manner. Reservoir 215 can be made of any suitable material. Reservoir 215 is fluidly coupled with dispenser assembly 214 by way of connection 217.

Connection 217 can, for example, be formed as a hose or tube linking an interior of reservoir 215 (where sanitizer substance 318 is located) with dispenser assembly 214. Connection 217 can be made of any suitable material (for example, a polymer) and be connected to dispenser assembly 214 (such as by way of an input of dispenser assembly 214) and reservoir 215 in any suitable manner.

Port 220 is configured for providing an access to reservoir 215 in order to refill reservoir 215 with sanitizer substance 318. Port 220 can be located in any suitable location to allow for such access by a user. For example, port 220 can be located in well 209 and be fluidly connected with reservoir 215. In this way, user can access port 220 by opening well cover 108.

Advantageously, both fueling assembly 210 and hand sanitizer dispenser system 213 are integrated to well 209, and thus hand sanitizer dispenser system 213 can be hidden in well behind well cover 108 similar to fueling assembly 210.

Figure 3:
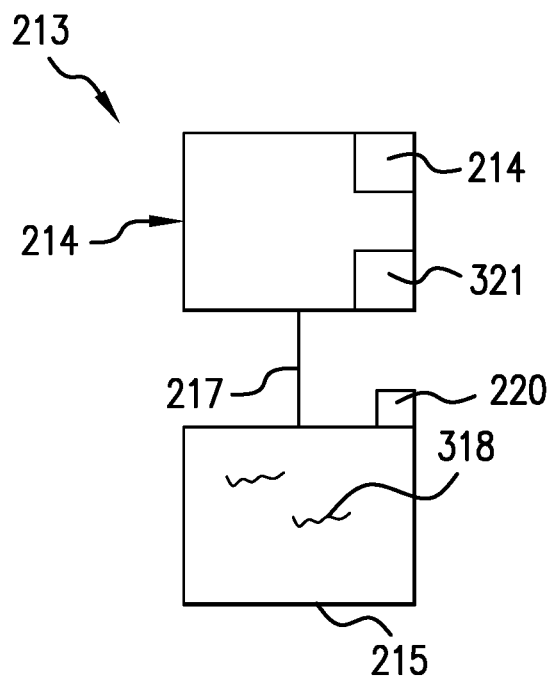
FIG. 3 illustrates schematically a diagram of the hand sanitizer dispenser system of FIG. 2, in accordance with an exemplary embodiment of the present invention.
Figure 4:
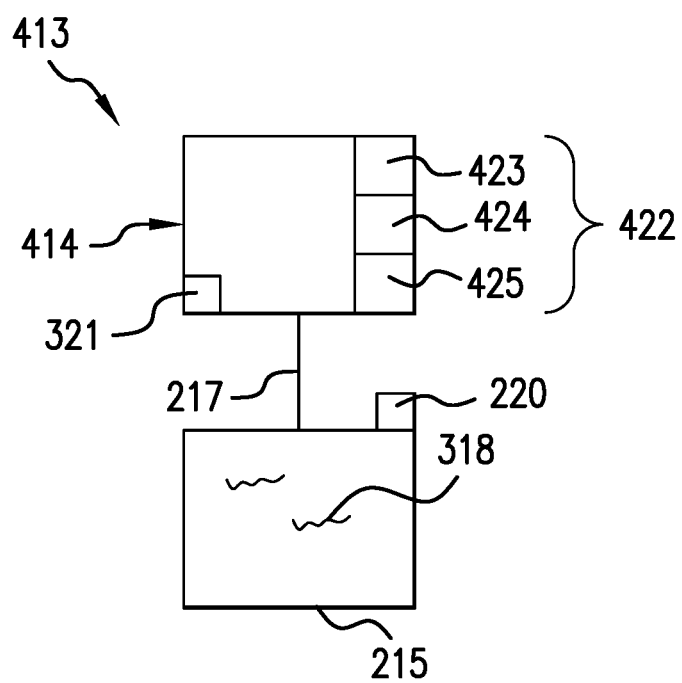
FIG. 4 illustrates schematically a diagram of another embodiment of the hand sanitizer dispenser system, in accordance with an exemplary embodiment of the present invention.

Referring now to FIG. 3, there is shown schematically a diagram of hand sanitizer dispenser system 213. Dispenser system 213 includes dispenser assembly 214, reservoir 215, connection 217 fluidly coupling dispenser assembly 214 and reservoir 215 together, and port 220. Dispenser assembly 214 is shown to include triggering button 219 used by user to pump or otherwise move sanitizer substance 318 from reservoir 215, through connection 217, and out of output device 321 (which can be formed as an output nozzle 321).

Referring now to FIG. 4, there is shown schematically a diagram of hand sanitizer dispenser system 413, according to another exemplary embodiment of the present invention. Many prior reference numbers with respect to dispenser system 213 are increased by a multiple of 100 and thus are substantially similar to the structures and function described and shown with respect to FIGS. 2-3, unless otherwise shown and/or described. Thus, dispenser system 213 is labeled as dispenser system 413 in FIG. 4. Dispenser system 413 is shown to include hand sanitizer dispenser assembly 414 (which provides the primary difference between dispenser system 213 and dispenser system 413), reservoir 215, connection 217, sanitizer substance 318, and port 220. Dispenser assembly 414 is substantially similar in structures and function with respect to dispenser assembly 214, unless otherwise shown and/or described. Rather than being manually triggered as with dispenser assembly 214, dispenser assembly 414 is automatically triggered and thus automatically dispenses sanitizer substance 318 via output device/nozzle 321. This is accomplished by a control system 422, which includes a sensor 423, a controller 424, and an actuator 425. Sensor 423 is configured for: sensing an object, such as a user's hand(s), positioned in a predetermined location, such as in front and/or underneath dispenser assembly 414; and for outputting, to controller 424, an object signal corresponding to the object sensed by sensor 423. Controller 424 is configured for: receiving the object signal from sensor 423; determining, based at least in part on the object signal, whether the object is in the predetermined location; and outputting a dispense signal to actuator 425 so that sanitizer substance 318 is pumped or otherwise moved from reservoir 215, through connection 217, and out of output device 321 to user. Actuator 424 can be any device configured for pumping or otherwise moving sanitizer substance 318 from reservoir 215 and out of output device 321. Further, dispenser system 413, and more particularly dispenser assembly 414, can include an electrical power source, such as a battery, to power any elements of control system 422, such as sensor 423, controller 424, and/or actuator 425. This embodiment of the present invention thus provides a hands-free version of the present invention, namely, hand sanitizer dispenser system 413.

Further, in general, controller 424 may correspond to any suitable processor-based device, such as a computing device or any combination of computing devices. Controller 424 may generally include one or more processor(s) and associated memory configured to perform a variety of computer-implemented functions (e.g., performing the methods, steps, algorithms, calculations and the like disclosed herein). Thus, controller 424 may include a respective processor therein, as well as associated memory, data, and instructions, each forming at least part of the respective controller 424. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory may generally be configured to store information accessible to the processor(s), including data that can be retrieved, manipulated, created, and/or stored by the processor(s) and the instructions that can be executed by the processor(s). In some embodiments, data be stored in one or more databases.

In use, hand sanitizer dispenser system 213, 413 is coupled with body 106, during manufacturing of vehicle 100 or subsequent thereto. After pumping gas into the gas tank of vehicle 100 (or refilling the vehicle with the appropriate sort of fuel), the operator may wish to clean the hands of operator before touching other parts of vehicle 100 or anything else. Thus, the operator can retrieve hand sanitizer substance 318 by way of dispenser assembly 214, 414. This can be accomplished, for example, by way of push button 219 (FIGS. 2-3) or automatically by control system 422 (FIG. 4).

Figure 5:
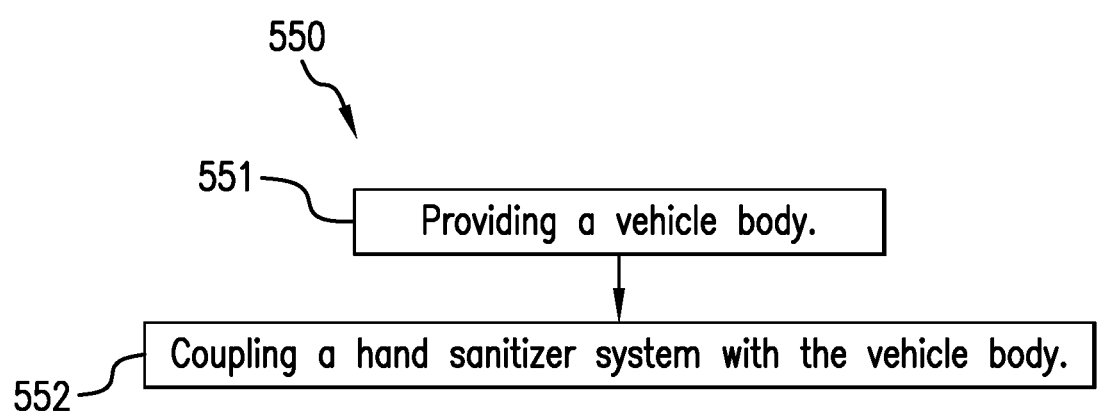
FIG. 5 illustrates a flow diagram showing a method of using an automotive vehicle, in accordance with an exemplary embodiment of the present invention.

Referring now to FIG. 5, there is shown a flow diagram showing a method 550 of using an automotive vehicle 100, the method 550 including the steps of: providing 551 a vehicle body 106; and coupling 552 a hand sanitizer dispenser system 213, 413 with the vehicle body 106. The body 106 can include an exterior side 107 which defines an exterior space 116, the hand sanitizer dispenser system 213, 413 including a hand sanitizer dispenser assembly 214, 314 configured for being accessed during a normal use from the exterior space 116. The hand sanitizer dispenser system can include a reservoir 115 fluidly coupled with the hand sanitizer dispenser assembly 214, 314. The automotive vehicle 100 can further include a fueling assembly 210 coupled with the body 106, the body 106 including a well 209, the hand sanitizer dispenser assembly 214, 414 and the fueling assembly 210 being positioned adjacent to one another in the well 209. The body 106 can include a well cover 108 configured for selectively covering the well 209.

It is to be understood that any steps of method 550 may be performed by controller 424 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 424 described herein, such as the method 550, is implemented in software code or instructions which are tangibly stored on a tangible computer readable medium. The controller 424 loads the software code or instructions via a direct interface with the computer readable medium or via a wired and/or wireless network. Upon loading and executing such software code or instructions by controller 424, controller 424 may perform any of the functionality of controller 424 described herein, including any steps of the method 550.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An automotive vehicle, comprising:
    a vehicle body defining an exterior side, a well formed on the exterior side, a fueling assembly at least partially positioned within the well, and a well cover that is movably positioned over the well, wherein in an open position of the well cover, the fueling assembly is visible and accessible by a user, and, in a closed position of the well cover, the fueling assembly is concealed by the cover; and
    a hand sanitizer dispenser system coupled with the vehicle body and at least partially positioned with the well such that in an open position of the well cover, the hand sanitizer dispenser system is visible and accessible by a user, and, in a closed position of the well cover, the hand sanitizer dispenser system is covered and concealed from view by the well cover.

2. The automotive vehicle of claim 1, the hand sanitizer dispenser system including a hand sanitizer dispenser assembly configured for being accessed during a normal use from the exterior spaceside.

3. The automotive vehicle of claim 2, wherein the hand sanitizer dispenser system further comprises a reservoir fluidly coupled with the hand sanitizer dispenser assembly.

4. The automotive vehicle of claim 3, the hand sanitizer dispenser assembly and the fueling assembly being positioned adjacent to one another in the well.

5. A method of assembling an automotive vehicle comprising an exterior side, a well formed on the exterior side, a fueling assembly at least partially positioned within the well, and a well cover that is movably positioned over the well, the method comprising the steps of:

coupling a hand sanitizer dispenser system to the well such that in an open position of the well cover, the hand sanitizer dispenser system and the fueling assembly are visible and accessible by a user, and, in a closed position of the well cover, the hand sanitizer dispenser system and the fueling assembly are covered and concealed from view by the well cover.

6. The method of claim 5, the hand sanitizer dispenser system including a hand sanitizer dispenser assembly configured for being accessed during a normal use from the exterior side.

7. The method of claim 6, wherein the hand sanitizer dispenser system further comprises a reservoir fluidly coupled with the hand sanitizer dispenser assembly.

8. The method of claim 7, the hand sanitizer dispenser assembly and the fueling assembly being positioned adjacent to one another in the well.

9. The automotive vehicle of claim 2, wherein the well includes a well surface that is visible to a user upon opening the well cover, wherein the hand sanitizer dispenser assembly and a fuel inlet of the fueling assembly are both disposed on the well surface.

10. The automotive vehicle of claim 9, wherein the hand sanitizer dispenser assembly is disposed on an upper portion of the well surface.

11. The automotive vehicle of claim 9, wherein a perimeter of the well surface has a shape that corresponds to a perimeter of the well cover, and wherein the hand sanitizer dispenser assembly and the fuel inlet are spaced from the perimeter of the well surface.

12. The automotive vehicle of claim 3, wherein the well includes a well surface that is visible to a user upon opening the well cover, wherein the hand sanitizer dispenser assembly, a fuel inlet of the fueling assembly, and a port of the reservoir are all disposed on the well surface.

13. The automotive vehicle of claim 2, wherein the hand sanitizer dispenser assembly has a front-facing side that faces the user in the open position of the well cover, and the well cover includes a rear-facing side that is positioned to face the front-facing side of the hand sanitizer dispenser assembly in a closed position of the cover.

14. The automotive vehicle of claim 2, wherein the well, the well cover and the hand sanitizer dispenser assembly are sized such that the well cover is positionable over the hand sanitizer dispenser assembly in the closed position of the well cover.

\* \* \* \* \*